United States Patent Office 3,333,963
Patented Aug. 1, 1967

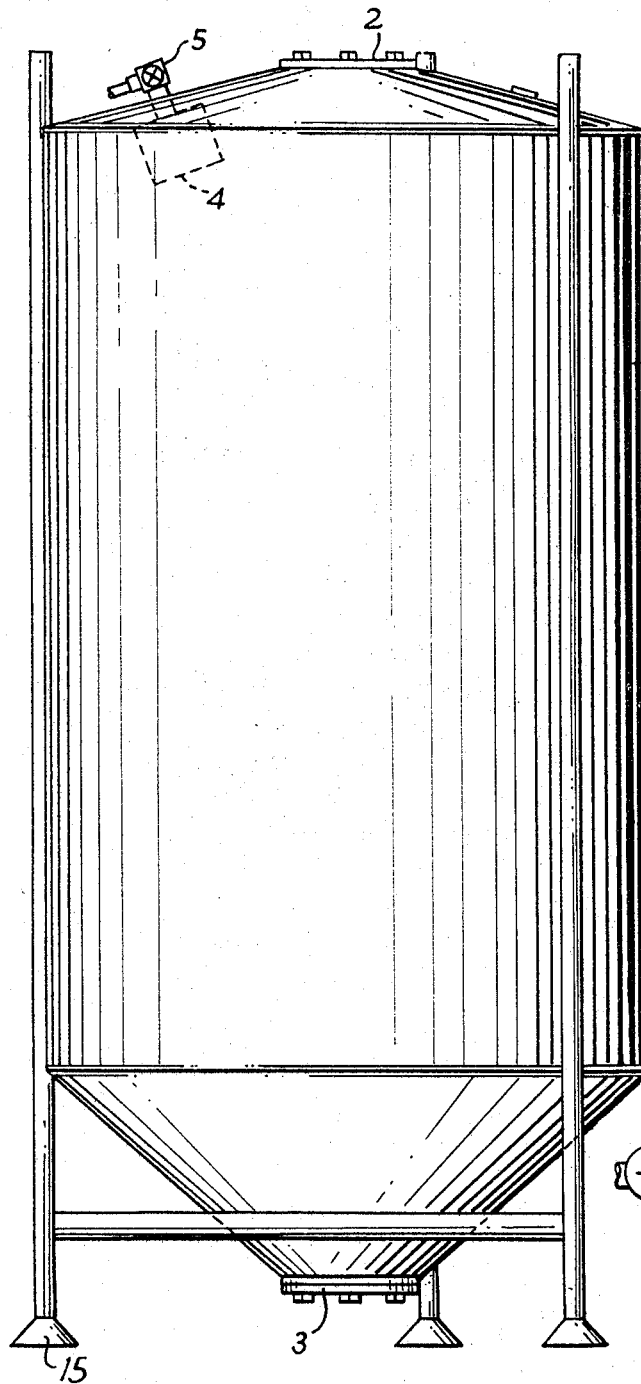
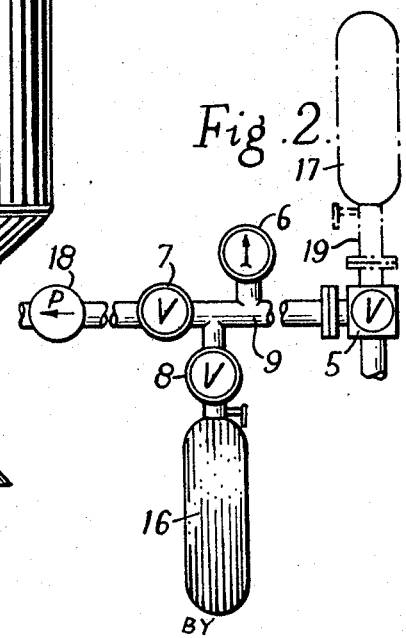

3,333,963
PROCESSING OF ROASTED COFFEE
Anthony James Robertson Moon, Church Hill, Merstham, and Ronald Cheyney Champion, Ilfield, Crawley, England, assignors to The Kenco Coffee Company Limited, London, England
Filed Dec. 17, 1963, Ser. No. 331,264
Claims priority, application Great Britain, Dec. 20, 1962, 48,094/62
2 Claims. (Cl. 99—68)

The present invention relates to improvements in the processing and packing of freshly roasted coffee.

It is well known that during the process of roasting coffee beans, the decomposition of vegetable matter results in the generation of gas, which is mainly $CO_2$. The gas is trapped in the individual cells of the coffee bean. Grinding the coffee naturally assists the rate at which the gas evolves, but even ground coffee gives off gas for a considerable time.

Where coffee was roasted in retail shops and sold to the public for immediate consumption, the occluded gas did not present any problem. Modern packaging techniques and methods of distribution, however, have required that coffee should be packed in sealed containers which would preserve the fresh flavour of the coffee over long periods. Early attempts to seal freshly roasted coffee in tins resulted in the occluded gas developing high gas pressures which, in many cases, caused the tins to become distended and ruptured.

Modern vacuum or gas-packing techniques, particularly when using flexible plastic packages have made the problem of gas pressures more acute. Pressures above atmospheric which were acceptable in tins cannot be tolerated in flexible packages.

In the case of gas-packing, it is essential to ensure that the product being packed does not give off gas after the packs are sealed. For this reason it has not been possible to pack such products as fresh coffee directly using the usual technique of gas-packing.

Many attempts have been made to find a solution to this problem, but so far packers have found no answer, except to allow the coffee to stand for some hours until surplus occluded gas has diffused from the coffee bean tissues into the atmosphere. Although widely accepted, this simple expedient has seriously detracted from the quality of the coffee, because at the same time as the gas is being evolved, staling and loss of flavour take place, due to the uptake of oxygen from the ambient air by the roasted coffee.

There is also considerable commercial objection to the amount of space taken up in coffee packing factories by the roasted coffee while it is standing during the necessary waiting period. It is true that a wide variety of vacuum packing machines have been developed which are capable of removing interstitial air, that is air surrounding the particles of coffee in the package, but they have not been successful in removing the occluded gas, the gas trapped in the cells of the coffee.

The object of the present invention is to provide a process for pre-conditioning freshly roasted coffee, which substantially avoids the above mentioned disadvantages.

According to the present invention there is provided an improved method of processing freshly roasted coffee, characterised in that, after the preliminary and known steps of roasting or, in the case of ground coffee, roasting and grinding, the roasted coffee is placed in a container, the air in said container is evacuated to a point at which the internal pressure in the container is equal to the vapor pressure of the coffee, about 500 mm. Hg, introducing into the container an inert gas to further reduce the percentage of oxygen in the interstitial and headspace gas in the container, effecting a second pressure reduction in the container to further reduce the percentage of oxygen, allowing an adequate interval of time for the evolution of occluded gas in the coffee, introducing into the container an inert gas to bring the pressure slightly in excess of atmospheric pressure and discharging the processed coffee for packing. During the packing operation an inert gas is injected into the container to assist the discharge of the processed coffee and to decrease the intake of air to the open container.

Further according to the present invention there is provided apparatus for carrying out the method of the present invention consisting of a closed container, that is transportable, having a vacuum sealable charging port and a vacuum sealable discharging port, an inlet valve on the said container adapted to have detachably connected thereto a manifold comprising two or more isolating valves and a compound vacuum and pressure gauge whereby the container may be connected either to a vacuum pump or to a source of gas supply.

It has been discovered, that the pressure of the occluded gas in the cells of the coffee varies according to the type of coffee and the degree to which it is roasted. In the case of highly roasted and ground coffees, the pressure may reach 5 atmospheres, while lightly roasted coffee may contain gas at only 1½ atmospheres. In order to give the utmost advantage in the packing of a wide variety of coffees, the present invention has allowed for varying degrees of pre-conditioning treatment.

Freshly roasted coffee contains an abundance of aroma, and under controlled conditions such as provided by the present invention there need be no danger of destroying the aromatic quality of the coffee by subjecting it to a high vacuum process.

The invention will be more fully described with reference to the accompanying drawings in which:

FIGURE 1 shows a container and,

FIGURE 2 shows the gas circulating and vacuum pump connections and,

Figure 3:
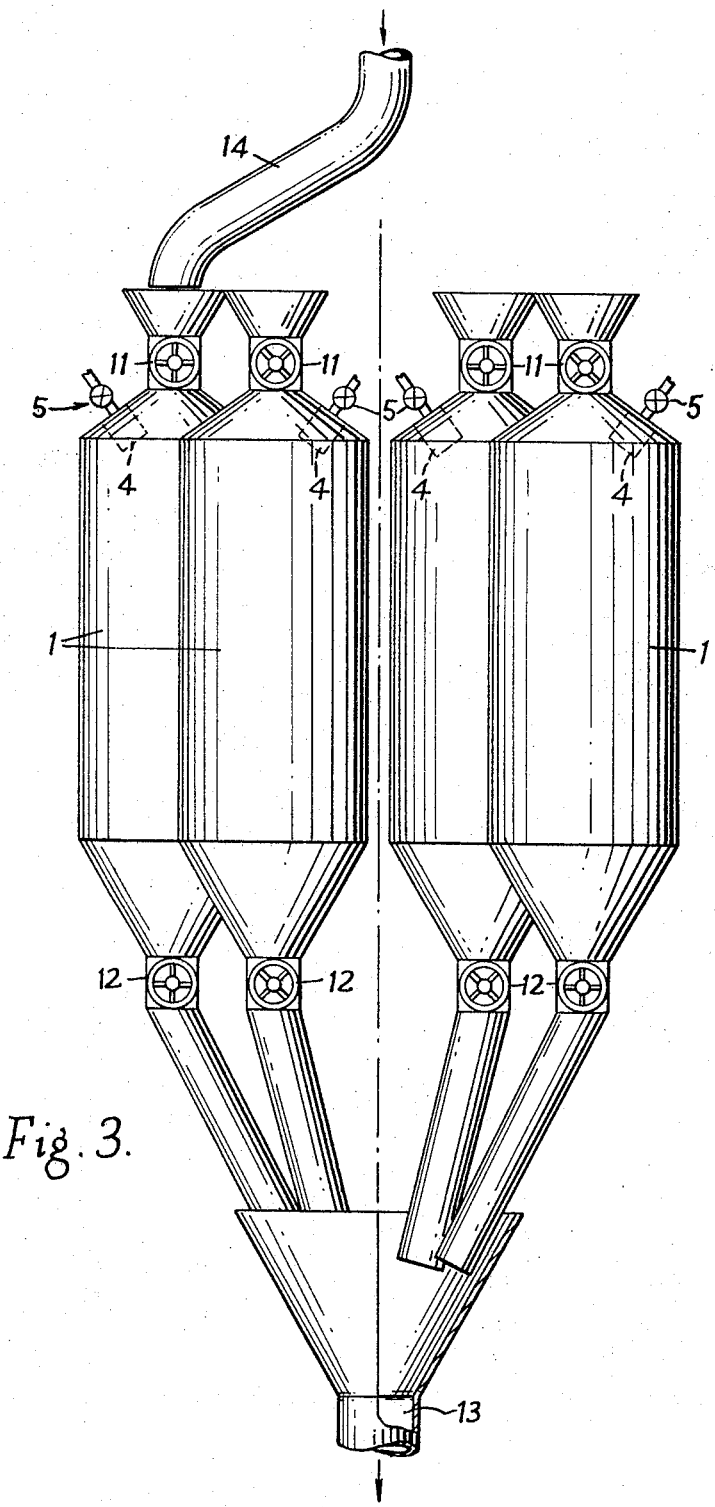
FIGURE 3 illustrates in diagrammatic form a suitable layout for larger installations.

Referring to the drawings, according to a preferred method the coffee to be processed is placed in a closed container 1 immediately after the known and preliminary steps of roasting, or in the case of ground coffee, roasting and grinding. A high efficiency vacuum pump 18 is then applied to the container through a valve 7 and a valve 5 and headspace and interstitial gas in the container 1 is evacuated. In order to remove oxygen from the headspace and interstitial gas in the container, without danger to the aromatic quality of the coffee, an inert gas, for example, carbon dioxide or nitrogen is introduced into the container 1 through a valve 8 and valve 5 when the internal pressure in the container 1 has been reduced to the vapour pressure of the coffee.

A second evacuation of the headspace and interstitial gas from the container 1 is then effected to satisfactorily reduce the oxygen content. The isolating valves 7 and 8 which are fitted on a manifold, FIGURE 2, are then closed and a sufficient period of time is allowed to lapse for the evolution of the occluded gas from the cells of the coffee. A compound vacuum and pressure gauge 6 is attached to the pipe line connecting the manifold to the inlet 5 on the container 1 to enable the progress of the evolution of the gas to be observed.

It is to be noted that in the case of highly roasted coffees containing a larger amount of occluded gas at higher internal pressure in the individual cells, it is necessary to effect a third evacuation of the container.

Since the rate of diffusion of the occluded gas from the cells of the coffee is directly proportional to the difference between the internal and external pressures, it is at the point where the occluded gas pressure is approaching atmospheric pressure that the evacuation of the container is most important. It is therefore always necessary to control the pressure registered by the vacuum gauge so that the pressure gradient is maintained until the occluded gas reaches atmospheric pressure. At this point the processed coffee is ready for packing.

It is generally acknowledged that coffee which has been vacuum packed stales more rapidly than normal when the the package is opened to the atmosphere. It has been discovered that the major factor which gives rise to this condition is that the cells of the coffee, which has been under a vacuum for a prolonged period, contain gas at a very low pressure, thus, when exposed to the atmosphere, the normal pressure gradient is reversed and the cells absorb oxygen from the air more rapidly than normally. To overcome this objection before the container is opened for the packing of the coffee, an inert gas is flowed in to a pressure slightly exceeding atmospheric pressure. This arrangement makes possible the packing of pre-conditioned coffee without significant absorption of oxygen from the atmosphere, provided that packing of the contents is carried out expeditiously. The container is constructed so that it can be used as a transportable hopper, from which, the coffee may be discharged directly into any conventional weighing machine. When the container is used as a transportable hopper it is supported in a stand 15. A supply of inert gas is passed into the container while the coffee is being discharged as explained later so that the amount of air drawn into the opened container is reduced to a minimum.

For carrying out the method of this invention the container 1 may be of any suitable shape and size according to the particular type of installation. The container is provided with a charging port 2 and this charging port 2 is equipped with an efficient vacuum seal of a sufficient diameter to allow the coffee to be easily poured into the container. A discharge port 3 equipped with a vacuum seal is provided, preferably, at the base of the container 1, although in certain circumstances the discharge port can be situated in the side wall of the container. These ports are opened manually, as required.

The valve 5 fitted to the container is provided with a simple filter 4 which is fitted to that part of the valve 5 which is inside the container 1. The filter 4 is provided to prevent fine particles of ground coffee being drawn into the vacuum equipment during its operation.

The valve 5 is adapted to receive a detachable manifold to provide connection between the container 1 and vacuum pumping equipment and a source of gas supply. A simple manifold is provided to control the vacuum and gas supply equipment. A typical arrangement is shown in FIGURE 2 where the compound vacuum and pressure gauge 6 is inserted in the pipeline 9 which would be connected to the valve 5. The isolating valves 7 and 8 provide control means for the vacuum and gas supply equipment. As shown in FIGURE 2 a vacuum pump is connected to the pipe line 9 leading to the valve 7. The gas supply to the valve 8 is shown as being obtained from a cylinder 16.

When the container is used as a hopper for attachment to weighing machines which are open to the atmosphere the manifold leading to the vacuum pumping and gas supply equipment is detached from the inlet valve 5 and a low pressure gas pipe line 10 receiving gas from another cylinder 17 is connected to the valve. This arrangement assists the discharge of the coffee from the container and decreases the tendency for air to enter the container as the coffee is discharged. In the case of gas packing this arrangement is not necessary because the supply of inert gas is applied at the point of packing. The process described above can be adapted to larger scale operations by interconnecting a number of containers working on the same principle. FIGURE 3 shows a typical arrangement of the system in which a number of containers 1 are grouped in a circle. The tops of the containers are fitted with large bore valves 11 of any vacuum sealable type through which coffee is loaded into the container from a rotary spout 14. Similar large bore discharge valves 12 are fitted at the base of the containers. The discharge valves 12 are connected to a common discharge chute 13 through which the coffee is taken after processing to a packing plant. Filters 4 and valves 5 are fixed to the top of each container in the same way as shown in FIGURE 1. The valve 5 of each container is connected to a simple manifold as shown in FIGURE 2 to provide a connection to vacuum pumping equipment, and a source of gas supply. In such an installation opening and closing of the valves 11, 12 and 5 may be fitted for remote control by conventional hydraulic mechanism.

We claim:

1. A method for pre-conditioning freshly roasted coffee prior to packaging which comprises the steps of placing the roasted coffee into a conditioning container, reducing the pressure in said container to equal the vapor pressure of the coffee, filling the container with an inert gas to a positive pressure above atmospheric pressure to displace any remaining oxygen in the container, again reducing the pressure in said container to the vapor pressure of the coffee, maintaining said reduced pressure until evolution of the gas trapped in the cells of the coffee is completed, introducing additional inert gas into said container to a positive pressure slightly in excess of atmospheric pressure and discharging the coffee for packaging while maintaining said inert gas at a positive pressure.

2. The method according to claim 1 wherein the coffee is discharged from the conditioning container under the positive gaseous pressure within said container.

References Cited

UNITED STATES PATENTS

| | | | |
|---|---|---|---|
| 1,991,564 | 2/1935 | McLain et al. | 99—236 |
| 1,992,556 | 2/1935 | Tone | 99—152 |
| 2,062,109 | 11/1936 | Rogers | 99—152 X |
| 2,950,973 | 8/1960 | Cameron | 99—152 X |
| 3,039,882 | 6/1962 | Clinton et al. | 99—189 |

A. LOUIS MONACELL, *Primary Examiner.*

HYMAN LORD, *Examiner.*

M. W. GREENSTEIN, *Assistant Examiner.*